Figure 1:
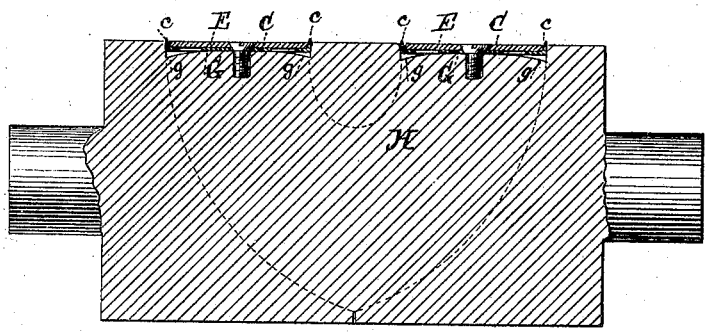

J. A. OLMSTEAD.
DIES FOR CUTTING AND EMBOSSING RUBBER.

No. 172,765. Patented Jan. 25, 1876.

Witnesses:
Michael Ryan
Fred. Haynes

John A. Olmstead
by his Attorneys
Brown & Allen

UNITED STATES PATENT OFFICE.

JOHN A. OLMSTEAD, OF GRANITEVILLE, NEW YORK.

IMPROVEMENT IN DIES FOR CUTTING AND EMBOSSING RUBBER.

Specification forming part of Letters Patent No. 172,765, dated January 25, 1876; application filed December 8, 1875.

*To all whom it may concern:*

Be it known that I, JOHN A. OLMSTEAD, of Graniteville, in the county of Richmond and State of New York, have invented certain Improvements in Roller-Dies for Cutting and Embossing Rubber; and I do hereby declare that the following is a full, clear, and exact description of the same.

My invention is particularly intended for cutting and embossing the uppers of rubber boots and shoes, and is also applicable, by suitable modification, to the cutting of soles for the same.

In the ordinary manufacture of rubber boots and shoes, the rubber is passed between rollers and pressed into sheet form, and afterward the cutting and embossing require two separate operations—one for the cutting and another for the embossing.

The pattern to be stamped or embossed on the rubber is engraved on the embossing-roller, which is kept heated to a certain and uniform temperature by means of steam; and when the pattern is to be changed, it is necessary to remove the roller and replace it by another bearing a different pattern, and to heat the roller thus substituted. The common practice is to emboss the sheets as they are formed, and afterward cut out the uppers by hand.

My invention consists in a novel construction and combination of a roller and detachable cutting and embossing dies, whereby the cutting and embossing of the rubber are performed at one and the same operation, and whereby provision is made for protecting the edges of the cutting-die, and also for changing the embossing-pattern, without removing the roller or causing a material variation in its temperature.

In carrying out my invention, I construct the cutting-die of thin sheet-metal, with its profile corresponding with that which is to be imparted to the work. The edges of this plate or sheet are turned up and sharpened to form cutting-edges; and between these cutting-edges and the center of the plate are openings for the purpose of increasing the degree of elasticity. The entire plate and cutting-edges may be made in one piece of elastic metal; or the central portion may be ordinary in elastic sheet metal or composition, and the cutters made of tempered steel and secured to the plate by elastic strips; or said strips may be in one piece with either the cutting-edge or the central portion. In most cases it will be found preferable to make the entire plate and cutters in one piece.

The embossing-die consists of a metal plate, having its profile corresponding with that of the cutting-die, and carrying the pattern which is to be embossed on the work. It is sufficiently smaller than the cutting-die to fit the same nicely between the cutting-edges, and is of a thickness not quite equal to the depth of the cutting-edges, so that said cutting-edges project slightly beyond the surface of the embossing-plate when no pressure is exerted upon them. These two plates are curved to correspond with the periphery of the roller to which they are to be applied. This roller is of the usual construction employed in the ordinary process, except that it has in its face a recess corresponding in profile with that of the cutting-die, and of a depth about equal to the combined thickness of the two plates. In the recess is a depression or gutter, which runs completely around the entire outline thereof, so that the sides or edges of the recess are deeper than the central portion.

The cutting and embossing dies are placed together and then secured in the recess by screws or otherwise, and the roller is arranged in the machine in any suitable manner in connection with a pressure-roll.

The rubber passes between the dies and the pressure-roll, and is cut and embossed at one operation.

When the cutting-edges have penetrated through the rubber and reached the surface of the pressure-roll, the elasticity of the strips by which they are connected with the plate allows them to be pressed into the depression or gutter until their edges no longer project beyond the surface of the embossing-plate. By this means the cutting-edges are preserved from injury, and at the same time the embossing-die is enabled to exert the desired pressure on the rubber and leave thereon the impression of its pattern.

When the pattern is to be changed, the embossing-die is removed and replaced by another without the necessity for removing the roller from its bearings, or allowing it to become cool.

When the dimensions of the roller and the dies with relation to each other will admit, there may be two or more sets of dies applied to one roller.

When it is desired to emboss only without cutting, an embossing-die may be attached to a plain-faced roller.

The accompanying drawing illustrates a mode of carrying out my invention.

Figure 2:
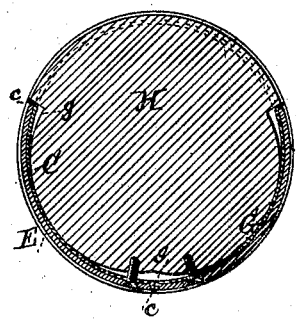
Figure 3:
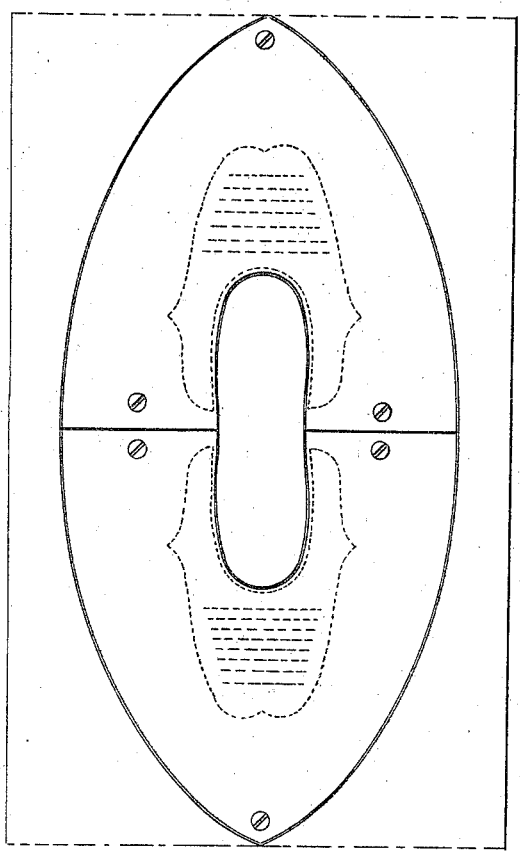
Figure 4:
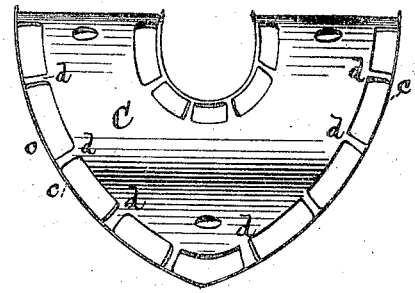

Figure 1 is a longitudinal sectional view of a roller provided with cutting and embossing dies. Fig. 2 is a transverse section of the same. Fig. 3 is a view of two cutting and embossing dies before being bent and secured to the roller. Fig. 4 is a view of a cutting-die in the curved form in which it is secured in place.

The cutting-die is here shown as made of a single piece of elastic sheet metal, forming a plate, C, and of a suitable shape for cutting uppers for shoes. The edges of the plate C are turned up and sharpened to form cutting-edges $c$, and between these edges and the central portion of the plate are openings between strips $d$, which connect the cutting-edges to the central portion.

The embossing-die consists of a metal plate, E, of corresponding profile with the cutting-die, and fitting nicely therein between the cutting-edges.

The plates or dies C and E, fitted together as described, are placed in a recess, G, formed in the face of the roller H, and may be secured thereto by screws. The recess G has a depression or gutter, $g$, in its bottom, running entirely around its outline or boundary. The depth of this gutter is equal to the width of the cutters $c$, so that they may recede therein sufficiently far to prevent their edges from projecting beyond the face of the roller, and thus becoming injured.

The roller thus constructed and carrying the dies is placed in the machine in any suitable manner in connection with a pressure-roller. It is, preferably, placed in such connection with the rollers which press the rubber into sheet form as to receive the sheet-rubber immediately after it is pressed by said rollers, and cause it to pass between the dies and the pressure-roller, and be cut and embossed at one operation.

When the cutting-edges $c$ have penetrated through the rubber and reached the surface of the pressure-roller, the elasticity of the plate C or the strips $d$ allows the cutters to yield under the pressure of the pressure-roller, and to recede into the depression or gutter $g$, so as to prevent their cutting-edges from being injured.

The embossing die or plate E is rigid and unyielding, and the central portion of the recess G corresponds with the concave surface of said plate, so that the pressure is uniform on all portions of said concave surface, and, consequently, the rubber, in passing between the dies and pressure-roller, is submitted to a uniform pressure from the embossing-die, and thus receives an impression from the pattern carried thereby at the same time that it is cut by the cutting-die.

The rollers herein referred to may be of cast-iron or any other metal.

What I claim as new, and desire to secure by Letters Patent, is—

1. The combination, with a roller, of a detachable yielding or elastically-applied cutting-die, substantially as herein described.

2. The combination, with a roller, of a detachable embossing-die, constructed and arranged to operate with the cutting-die, substantially as herein described.

3. The combination of the roller H, having the recess G and depression or gutter $g$, and the cutting-die C, having yielding cutting-edges $c$, connected to the central portion by elastic strips $d$, substantially as herein described.

4. The combination, with the roller H and cutting-die C, of the plate E, constituting the embossing-die, and also serving to secure the cutting-die in place, substantially as herein described.

JOHN A. OLMSTEAD.

Witnesses:
HENRY T. BROWN,
FRED. HAYNES.